United States Patent [19]

Kirch

[11] 4,395,523
[45] Jul. 26, 1983

[54] METHOD OF MAKING AND RECOVERING OLEFIN POLYMER PARTICLES

[75] Inventor: William Kirch, Clinton, Iowa

[73] Assignee: Chemplex Company, Rolling Meadows, Ill.

[21] Appl. No.: 382,488

[22] Filed: May 27, 1982

Related U.S. Application Data

[60] Continuation of Ser. No. 257,222, Apr. 23, 1981, abandoned, which is a continuation-in-part of Ser. No. 71,129, Aug. 30, 1979, abandoned, which is a division of Ser. No. 887,668, Mar. 16, 1978, Pat. No. 4,199,546.

[51] Int. Cl.³ .............................................. C08F 2/14
[52] U.S. Cl. .................................... 526/64; 526/348.5
[58] Field of Search .............................. 526/64, 68, 70

[56] References Cited

U.S. PATENT DOCUMENTS

| | | | |
|---|---|---|---|
| 2,728,753 | 12/1955 | Russum et al. | 526/68 |
| 3,203,766 | 8/1965 | Mudd et al. | 422/132 |
| 3,242,150 | 3/1966 | Scoggin | 260/88.2 |
| 3,334,516 | 8/1967 | Cedrone | 210/512 R |
| 3,374,211 | 3/1968 | Marwil et al. | 526/64 |
| 3,816,383 | 6/1974 | Stotko | 260/94.9 F |
| 4,007,321 | 2/1977 | Scholz et al. | 526/64 |
| 4,070,168 | 1/1978 | Beattie | 55/205 |
| 4,120,795 | 10/1978 | Laval | 55/459 R |

Primary Examiner—Stanford M. Levin
Attorney, Agent, or Firm—Wood, Dalton, Phillips, Mason & Rowe

[57] ABSTRACT

A process and apparatus for the polymerization of an olefin in a particle form process to form solid particles of polyolefin in a liquid slurry in a polymerization zone and the solid polymer particles are separated from the liquid diluent and any unreacted monomer, in which a portion of the slurry is diverted in the polymerization zone through a liquid cyclone separator. This separator has a separating portion thereof in heat exchange relationship with the zone liquid. After the separation in the liquid cyclone, the clarified separated liquid is returned continuously to the polymerization zone and the resulting concentrated slurry is directed to a place of separation of the polymer particles.

3 Claims, 5 Drawing Figures

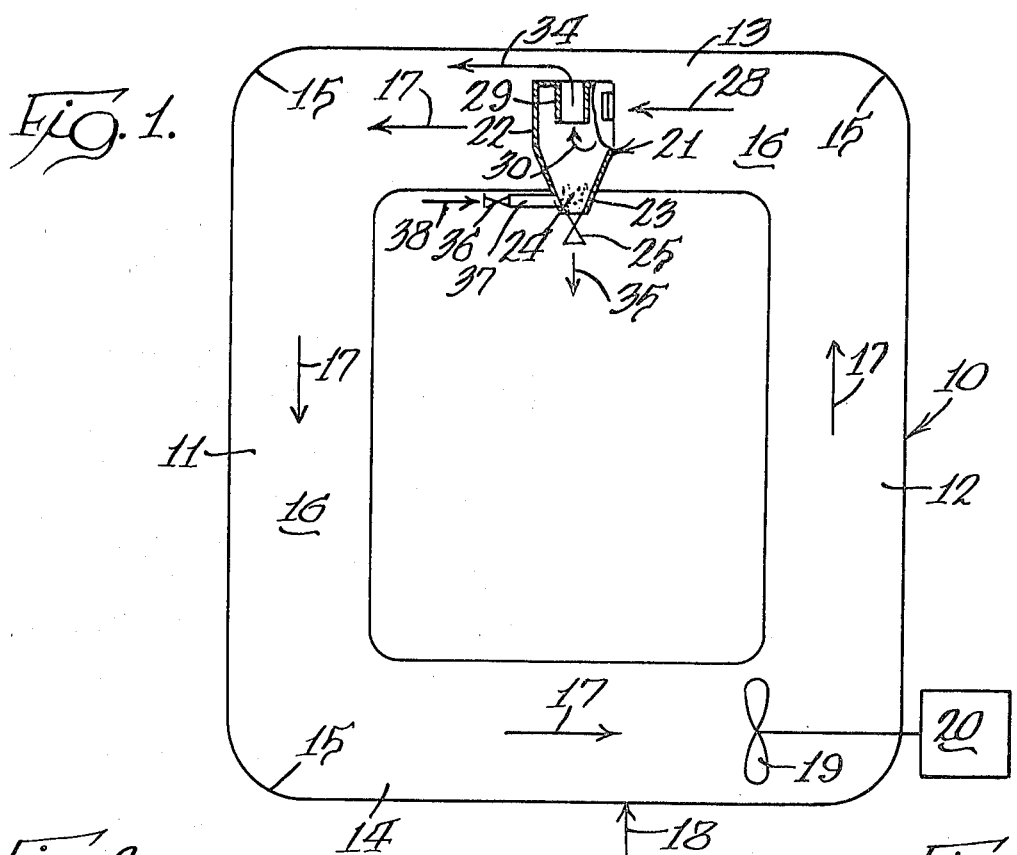
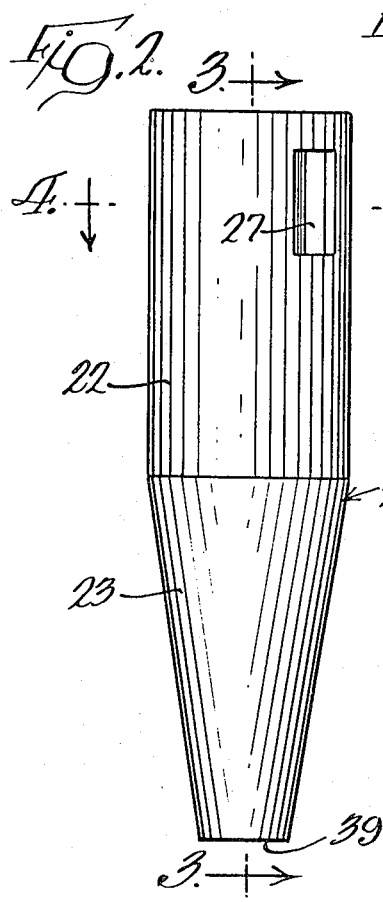
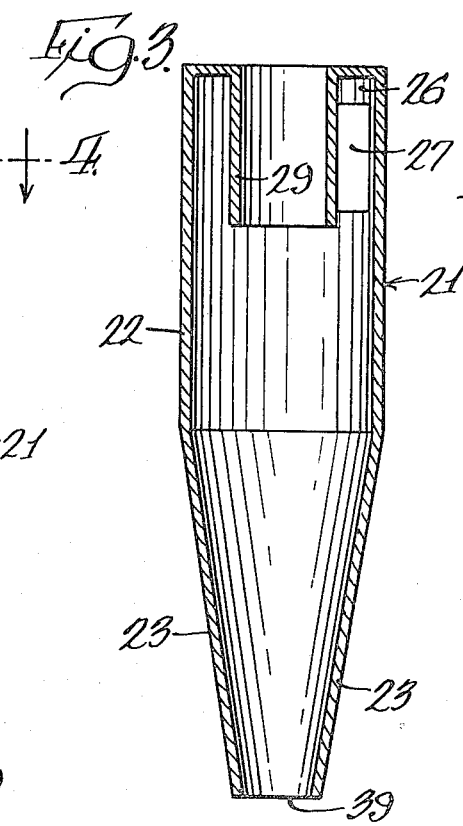
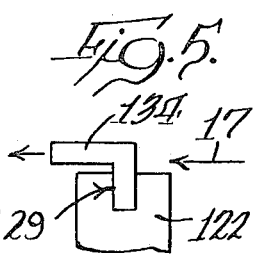
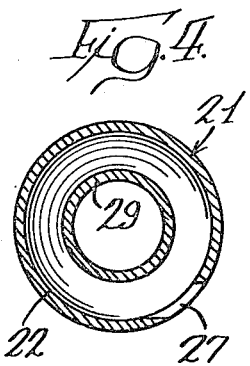

METHOD OF MAKING AND RECOVERING OLEFIN POLYMER PARTICLES

CROSS-REFERENCE TO RELATED APPLICATIONS

This application is a continuation of application Ser. No. 257,222 filed Apr. 23, 1981, now abandoned, which was a continuation-in-part of Ser. No. 71,129 filed Aug. 30, 1979, now abandoned, which was a division of application Ser. No. 887,668 filed Mar. 16, 1978 which is now U.S. Pat. No. 4,199,546 dated Apr. 22, 1980.

BACKGROUND OF THE INVENTION

This invention relates to a process and apparatus wherein an olefin is polymerized in a particle form process in a liquid diluent to form a liquid slurry in a polymerization zone and the particles are separated from the slurry by a liquid cyclone separator in heat exchange relationship with the polymerization slurry to receive heat therefrom, the resulting clarified liquid is directed back to the polymerization zone and the concentrated slurry is withdrawn from the cyclone.

The separation of the solid particles of polymer formed in a particle form process is a problem because it is necessary that the solid particles be removed from the liquid for further processing and the liquid returned to the polymerization zone for further polymerization because this liquid contains in addition to the liquid diluent the unreacted monomer or monomers. Several prior patents disclose various ways of separating the solid particles and these are as follows.

Phillips Petroleum Co. U.S. Pat. No. 3,242,150 discloses a continuous loop polymerization reactor having a receiving zone or settling leg at the bottom of the vertical reactor into which the solid particles gravitate. Although this provides the separation of the solid particles such a system poses certain operating problems in view of the mechanical complexities of the settling leg system, the risk of polymer agglomeration and resultant blockage of the settling leg, the extreme sensitivity of the efficiency of the system to the particle size and bulk density of the slurry, and the circulation rate of the polymer particles in the reactor as they pass over the entry to the settling leg.

Other processes have been described to improve the slurry removal system from a particle form polymerization reactor, such as the use of an external liquid cyclone (hydroclone) as disclosed in U.S. Pat. Nos. 3,816,383 and 4,007,321. However, these processes require complicated piping and valving to and from the hydroclone and are dependent upon maintaining and controlling a pressure gradient across the hydroclone and in some cases returning a recycle flow back to the polymerization reactor to prevent plugging of the system. In addition, since all the piping, valving and vessels are external to the reactor system, they must be heated and insulated to control the slurry temperature near the reactor polymerization temperature to prevent the precipitation of the low molecular weight soluble polymer from the reactor diluent resulting in coating and pluggage of lines and vessels if the temperature drops too low or to prevent solubilization of the slurry polyolefin particles with the resultant formation of polymer rope and subsequent plugging in the flash tank and/or drier if the temperature rises too high.

SUMMARY OF THE INVENTION

In this invention the process and apparatus provide for readily and efficiently removing from the polymerization zone of the reactor the slurry for removal of the solids after which the clarified liquid is returned to the reactor. This is done in this invention without the use of the settling legs or external liquid cyclones of the above prior art and therefore without their disadvantages. The solid polymer particles are simultaneously separated from the major part of the liquid and recovered in concentrated form, thereby facilitating efficient and economical after-treatment of the polymer and the diluent.

The above is accomplished by providing in the polymerization zone of the reactor a liquid cyclone or "hydroclone" through which a portion of the liquid containing the particles, diluent, catalyst, unreacted monomer or monomers and the like is directed and in this cyclone the particles are separated from the diluent by centrifugal action in concentrated form and the concentrate directed to the exterior of the reactor while the resulting clarified liquid is directed back into the reactor. The separating portion of the cyclone is automatically maintained at the proper temperature because it is in heat exchange relationship with the interior of the reactor and the contained liquid slurry.

BRIEF DESCRIPTION OF THE DRAWINGS

FIG. 1 is a semi-schematic side elevational view partially in section of an apparatus embodying the invention.

FIG. 2 is an enlarged side elevational view of a liquid cyclone used in the apparatus of FIG. 1.

FIG. 3 is a vertical sectional view taken substantially along line 3—3 of FIG. 2.

FIG. 4 is a horizontal sectional view taken substantially along line 4—4 of FIG. 2.

FIG. 5 is a fragmentary view partially in vertical section illustrating a second embodiment of the top or liquid outlet portion of the liquid cyclone.

DESCRIPTION OF THE PREFERRED EMBODIMENTS

In the embodiment shown in the drawings the vertical loop reactor 10 comprises a pair of side vertical legs 11 and 12, a top horizontal leg 13 and a bottom horizontal leg 14 interconnected by smooth corner bends 15 to provide a continuous reaction zone 16 through which the liquid comprising the monomer or monomers, inert diluent and catalyst travel in a continuous closed path 17 after being injected into the reactor through an inlet identified at 18. This continuous circulation in the path 17 is maintained by a circulating pump 19 powered by a motor 20.

In the upper horizontal leg 13 there is provided a liquid cyclone 21 or "hydroclone" having an upper vertical cylindrical portion 22 extending into the horizontal leg 13 so as to be immersed in the liquid in the reaction zone.

In addition to the cylindrical separating portion 22 the cyclone has a bottom inverted conical collecting portion 23 part of which is external of the reactor 10 in which the slurry concentrate 24 collects to the bottom by gravity in the customary cyclone manner to be withdrawn through a valve 25. Because the separating portion 22 and a portion of the collection zone 23 are within the flow path 17 in the polymerization zone 16 this part of the cyclone and the contained reactants, reaction products and monomers are automatically maintained at the same temperature as that in the reaction zone 16.

In order to provide for the separation the upper end 26 of the liquid cyclone 21 is provided with a tangential side opening 27 positioned in the reactor horizontal leg 13 so that a portion 28 of the liquid flow in the path 17 is directed tangentially into the interior of the cyclone where it is diverted spirally downwardly around and then upwardly through a vertical internal pipe 29 having open top and bottom ends as shown in FIGS. 1 and 3.

This cyclonic liquid flow as indicated at 30, with the resulting down flow and then up flow through the pipe 29, causes the circulated particles or slurry 24 to separate and the resulting clarified liquid 34 is directed back into the reaction zone 16. This clarified liquid of course comprises the inert diluent, unreacted monomers, catalyst and any other normal ingredients for the olefin polymerization reaction.

The valve 25 may be operated continuously or intermittently, as is customary in this art, to discharge the slurry concentrate stream 35 to a place of separation such as the customary flash chamber or the like. Thus the diverted underflow or slurry concentrate stream 35 may be easily further processed to recover the solid polymer and liquid constituents. To control the rate of solid removal from the reactor there is provided a valve 36 and pipe 37 combination for supplying additional diluent 38 as needed or as desired. For example, during reactor start-up it is desirable to minimize solids discharge from the reactor so as to build up the solids content of the reactor rapidly, so as to maximize catalyst productivity and minimize the time required to bring the reactor to full production rate.

In a typical embodiment of the process and apparatus of this invention a hydroclone 21, 5 in. ID×10 in. straight side 22 length with a 10 inch conical section 23, having a 2 inch diameter discharge hole 39 was installed inside a 20 inch ID polymerization loop reactor 10 similar to the schematic drawing shown in FIG. 1. The hydroclone inlet 27 was a 1 in.×3 in. rectangular hole cut tangentially in the top side 22 of the vessel and a 2.5 in. diameter×4 in. long dip pipe 29 to discharge the clarified diluent 34 back into the reactor. The hydroclone was positioned in the reactor such that the tangential inlet hole to the hydroclone was approximately on the center line of the pipe loop reactor and facing the direction of flow of the reactor contents and the portion 22 of the hydroclone 21 within the reactor occupied only a fraction of the cross sectional available space.

A cycle valve 25, actuated by a reactor pressure controller (not shown) discharged polymer solids plus diluent 35 from the bottom of the hydroclone into a flash tank (not shown) where the diluent and unreacted monomer was vaporized and passed overhead in the customary manner as illustrated in the above listed prior art patents for purification and recycling back to the reactor, and the polymer solids were discharged from the bottom of the flash tank to a polymer drier and then conveyed to storage, again in the customary manner.

During the run, 7000 pounds per hour of ethylene, 53 pounds per hour of hexene-1, 7000 pounds per hour of isobutane diluent and a small amount of a silica supported chromium oxide catalyst was fed continuously to the loop reactor through inlet 18. Reactor polymer solids content was measured at 30 wt. %. There was continuously removed from the reactor through the cycle valve 25 approximately 6700 pounds per hour of polyethylene and 7000 pounds per hour of isobutane together with any unreacted ethylene and hexene-1. The solids content of the discharge stream was calculated at approximately 48 wt. %. Thus, the use of the internal hydroclone resulted in increasing the effluent concentration from the reactor from 30 wt. % to 48 wt. % polyethylene, thus reducing the amount of diluent to be purified and recycled back to the loop reactor.

In addition, a comparison of the particle size of the polymer recovered from the hydroclone device 21, versus polymer produced similarly in an identical loop reactor but with settling leg discharge, illustrates another advantage of this invention, namely the recovery of larger and more uniform size polymer particles (see Table I). This has great process advantages in that it permits the operation of the reactor at higher wt. % solids levels without any fouling problems, it maximizes the catalyst productivity by maximizing polymer solids resident time, it minimizes the problems encountered downstream of the reactor from polymer fines, such as improved filter bag life, improved recycle compressor operation (no fines carry through), and improved powder handling characteristics in conveying and processing.

TABLE I

| PARTICLE SIZE ANALYSIS OF RECOVERED POLYMER | | | | |
| --- | --- | --- | --- | --- |
| | % on 35 mesh | % on 60 mesh | % on 100 mesh | % on pan |
| Hydroclone discharge | 74.9 | 17.7 | 5.3 | 2.2 |
| Settling leg discharge | 56.7 | 5.4 | 27.3 | 10.6 |

ADVANTAGES OF THE INVENTION

The process and apparatus of this invention provides a simple structure without requiring settling legs, external hydroclones, auxiliary heat equipment and other temperature controls and avoids extensive piping, valves or flow control systems common to the prior processes. In addition, the process of this invention is very efficient with respect to energy requirements as it requires no heat input or temperature control system. The invention also permits a very simple control of rate of polyolefins solids discharged from the reactor and an improved particle size and particle size distribution of the polyolefins solids discharge from the reactor.

The use of the hydroclone 21 having the separating portion 22 immersed in the liquid in the reactor zone 16 not only provides for efficient heat transfer to maintain the separating portion 22 at the same temperature as the zone 16 but also utilizes the velocity of the flowable material in the flow path 17 to direct the portion 28 into and through the cyclone 21. Thus, no other pumps are required except for the monomer circulation pump 19 that is normally used in a polymerization reactor of this type.

The liquid cyclone not only permits locating the separating portion 22 within the liquid flow path 17 but also permits locating the major portion of collecting portion 23 of the cyclone internally of the reactor, as shown. By providing the liquid cyclone as described the temperature and the pressure within the cyclone are both automatically maintained at the temperature and pressure within the reactor.

FIG. 5 illustrates a second embodiment of the upper cylindrical portion and liquid discharge pipe of the cyclone. In this second embodiment the outlet pipe 129 has a right angle outlet portion 134 from the top of the upper cylindrical separating portion 122 of the liquid cyclone separator. Its outlet portion 134 is essentially parallel to the path of flow 17 of the circulated liquid within the reactor 10.

The process and apparatus of this invention using the internal hydroclone for separating the solid particles in the form of a concentrated slurry also results in larger and more uniform particles being produced and therefore recovered. The reactor therefore is operated at a higher weight percent solids level without the customary fouling problems that occur with higher weight percent solids levels in customary reactors with customary settling facilities for separating the solid particles.

In addition, this invention maximizes catalyst productivity by maximizing polymer solids residence time within the closed circuit reactor and at the same time minimizes production of polymer fines and the resulting problem of filter bag life, recycle compressor operation and powder handling problems in conveying and processing that occur when relatively large amounts of polymer fines are produced in the customary reactors.

Having described my invention as related to the embodiments shown in the accompanying drawings, it is my intention that the invention be not limited by any of the details of description, unless otherwise specified, but rather be construed broadly within its spirit and scope as set out in the appended claims.

I claim:

1. A method for producing and recovering solid polyolefin particles in a particle form olefin polymerization process, comprising:
   directing a flowing liquid stream comprising liquid diluent, olefin monomer and catalyst for the polymerization and the resulting polyolefin particles under polymerizing heat and pressure conditions in the flow path through a continuous loop comprising a polymerization zone;
   directing a portion of said flowing liquid stream from said loop through a liquid cyclone separator for producing a concentrated slurry of a portion of said particles and a separate relatively clear liquid, while exchanging heat between said flowing liquid stream in said loop and said flowing liquid stream in said separator by immersing said cyclone separator in said flowing liquid stream in said loop at said polymerization zone for maintaining said flowing liquid stream within said separator at substantially the same temperature as said flowing liquid stream in said loop at said polymerization zone to continue said polymerizing conditions while said portion of said flowing liquid stream is passing through said separator;
   returning said relatively clear liquid to said polymerization zone; and
   directing said concentrated slurry to a place of recovery of said particles.

2. The method of claim 1 wherein said relatively clear liquid is returned to said polymerization zone in a path that is at substantially right angles to said flow path through said polymerization zone.

3. The method of claim 1 wherein said relatively clear liquid is returned to said polymerization zone in a path that is substantially parallel to said flow path through said polymerization zone.

* * * * *